(12) United States Patent
Labagh

(10) Patent No.: US 9,058,575 B2
(45) Date of Patent: Jun. 16, 2015

(54) METHOD AND SYSTEM FOR CREATING AND MAINTAINING ACTIVITY PLANS

(76) Inventor: Justin R. Labagh, San Francisco, CA (US)

( * ) Notice: Subject to any disclaimer, the term of this patent is extended or adjusted under 35 U.S.C. 154(b) by 146 days.

(21) Appl. No.: 13/587,735

(22) Filed: Aug. 16, 2012

(65) Prior Publication Data

US 2013/0055086 A1 Feb. 28, 2013

Related U.S. Application Data

(60) Provisional application No. 61/527,547, filed on Aug. 25, 2011.

(51) Int. Cl.
*G06F 3/14* (2006.01)
*G06Q 10/06* (2012.01)

(52) U.S. Cl.
CPC ..................... *G06Q 10/06* (2013.01)

(58) Field of Classification Search
CPC ..................... G06F 3/14; G06F 3/17
USPC .......... 715/200–277, 700–867; 700/701–866; 709/201–229; 705/7.14, 7.18, 8, 705/50–29; 345/30–111; 725/14
See application file for complete search history.

(56) References Cited

U.S. PATENT DOCUMENTS

| | | | | |
|---|---|---|---|---|
| 2010/0153162 A1* | 6/2010 | Tam et al. | ......................... | 705/8 |
| 2012/0215578 A1* | 8/2012 | Swierz et al. | ................. | 705/7.14 |
| 2013/0007792 A1* | 1/2013 | Jeon et al. | ......................... | 725/14 |
| 2013/0167082 A1* | 6/2013 | Joo et al. | ........................ | 715/810 |
| 2013/0282421 A1* | 10/2013 | Graff et al. | .................... | 705/7.18 |

* cited by examiner

*Primary Examiner* — Ruay Ho
(74) *Attorney, Agent, or Firm* — Shun Yao; Park, Vaughan, Fleming & Dowler LLP

(57) ABSTRACT

A system for activity management with a user interface that allows a user to access previously authored activity plans on a mobile device. An activity plan includes one or more activity items, in which each activity item includes at least a title and description. When the system receives a user selection of an activity plan, the system obtains the activity plan from a database storing the previously authored activity plans and presents the activity plan to the user on the mobile device.

18 Claims, 20 Drawing Sheets

LIBRARY

502

| | | |
|---|---|---|
| 1 on 1 | Warm Up | Skyline |
| 2 on 2 | Shooting | Chabot |
| 2 on 0 | Zone Off | Full-Crt |
| 3 on 3 | Post Work | Jay Wight Drills |
| 3 on 0 | Zone Def | Press Drills |
| 4 on 4 | Guard Work | Free-Throws |
| 5 on 5 | Foot Work | No Dribble |
| 3 on 4 | Dribbling | Vegas Clinic Drills |
| 4 on 5 | Passing | |
| 5 on 6 | Catching | |

WARMUP

| Lay up Skips | | | |
|---|---|---|---|
| Clips | Uses | Thumb↑ | Thumb↓ |
| 3 on 0 Full Crt Lay-Ups | | | |
| Clips | Uses | Thumb↑ | Thumb↓ |
| Run-Slide-Run | | | |
| Clips | Uses | Thumb↑ | Thumb↓ |
| Balance Series | | | |
| Clips | Uses | Thumb↑ | Thumb↓ |
| Down and Backs | | | |
| Clips | Uses | Thumb↑ | Thumb↓ |
| Jump Rope | | | |

FIG. 5B

CCSF RAMS

Basketball   Practice 16 11/11/11                                                      1000

1002        NOTES ◄── 1004

4:00-4:05 3 on 0 Full Crt Lay-up
- No travel/full speed
- Lead with the pass                                 [NOTES] [COURT]

4:00-4:10 Perfection
- Communicate on end line                            [NOTES] [COURT]

4:10-4:20 Cone ¾ Crt Series
- Keep it tight
- Step into every shoot                              [NOTES] [COURT]

4:20-4:30 McGuire Man-Maker
- Set screens to get each other open
- Fake a pass to make a pass                         [NOTES] [COURT]

4:20-4:25 Rapid Free-Throws
- Hold follow-through

4:20-4:27 Water Break                                [NOTES] [COURT]
4:27-4:40 3 On 3 No Dribble and Go                   [NOTES] [COURT]
4:40-4:50 4 on 4 Shell Series                        [NOTES] [COURT]
- Hand on ball
- Screen out
- No "fluff" talk 4:50-5:00 5 Man Get Back                             [NOTES] [COURT]
- Stop Ball
- Reposition
- Communicate With Each Other
- Finish The Play
5:00-5:02 Water Break
5:02-5:10 Post Series + Guard Series                 [NOTES] [COURT]
5:10-5:20 5 On 5 Stop and Go                         [NOTES] [COURT]
- Get ball up floor within 4 seconds
- Designated break
- Keep track of possessions
5:20-5:30 Out of Bounds Game - No dribble - 4 Spots  [NOTES] [COURT]
- Set screens that make sense
- Be tricky
- Don't "un-plug"
5:30-5:33 Free Throws-Shoot-Till-You-Miss & Rotate   [NOTES] [COURT]
5:33-5:35 Water Break
5:35-5:45 8 min game - 1st 5 min & Last 3            [NOTES] [COURT]
- Don't foul
- No Turnovers
5:45-5:55 2 Stops On Zone Defense                    [NOTES] [COURT]

EQUIPMENT
- 4 cones
- 6 Tennis Balls
- 2 Hit Pads

FIG. 10

CCSF RAMS

Basketball   Practice 16 11/11/11

[NOTES]  We shot 3-21 from the 3. Also, 18 turnovers for 12pts and gave up 13 offensive rebounds.

4:00-4:05 3 on 0 Full Crt Lay-up
- No travel/full speed
- Lead with the pass

[NOTES] [COURT]

4:00-4:10 Perfection
- Communicate on end line

[NOTES] [COURT]

4:10-4:20 Cone ¾ Crt Series
- Keep it tight
- Step into every shoot

[NOTES] [COURT]

4:20-4:30 McGuire Man-Maker
- Set screens to get each other open
- Fake a pass to make a pass

[NOTES] [COURT]  ← 1102

4:20-4:25 Rapid Free-Throws
- Hold follow-through

4:20-4:27 Water Break
4:27-4:40 3 On 3 No Dribble and Go
4:40-4:50 4 on 4 Shell Series
- Hand on ball
- Screen out
- No "fluff" talk

[NOTES] [COURT]
[NOTES] [COURT]
[NOTES] [COURT]

1104  1106  1108

4:50-5:00 5 Man Get Back
- Stop Ball
- Reposition
- Communicate With Each Other
- Finish The Play

[NOTES] [COURT]

5:00-5:02 Water Break
5:02-5:10 Post Series + Guard Series
5:10-5:20 5 On 5 Stop and Go
- Get ball up floor within 4 seconds
- Designated break
- Keep track of possessions

[NOTES] [COURT]
[NOTES] [COURT]

5:20-5:30 Out of Bounds Game - No dribble - 4 Spots
- Set screens that make sense
- Be tricky
- Don't "un-plug"

[NOTES] [COURT]

5:30-5:33 Free Throws-Shoot-Till-You-Miss & Rotate
5:33-5:35 Water Break
5:35-5:45 8 min game - 1st 5 min & Last 3
- Don't foul
- No Turnovers

[NOTES] [COURT]
[NOTES] [COURT]

5:45-5:55 2 Stops On Zone Defense

[NOTES] [COURT]

EQUIPMENT
- 4 cones
- 6 Tennis Balls
- 2 Hit Pads

FIG. 11

METHOD AND SYSTEM FOR CREATING AND MAINTAINING ACTIVITY PLANS

CROSS REFERENCE TO RELATED APPLICATIONS

This application claims priority to U.S. Provisional Application No. 61/527,547, filed Aug. 25, 2011, which is hereby incorporated herein in its entirety by reference.

BACKGROUND

1. Field

This disclosure is generally related to creating and managing activity plans. More specifically, this disclosure is related to a method and system for creating activity plans by scheduling activity items. The activity plans can be practice plans used in sports coaching and the activity items can be practice drills for training athletes.

2. Related Art

In sports and other activities, coaches usually design practice plans for athletes and teams. To improve particular skill sets for the athletes, a coach may plan practice activities by consulting books, the Internet, and other sources of practice advice and drills. The coach may download training schedules from online websites, write down the practice descriptions on notebooks, and can also go online and watch videos of professional athletes performing maneuvers that the coach can later show to the athletes. These processes often involve manually taking notes while watching online videos. One can read through a written collection of practice drills and manually jot down the descriptions. The coach can haphazardly put together schedules of training programs using a written collection of practice activities, or even print out training routines downloaded from the Internet. Unfortunately, this piecemeal process of putting together and managing training programs is cumbersome and insufficient for maintaining and using an up-to-date and effective training program.

SUMMARY

One embodiment of the present invention provides a system for activity management. During operation, the system provides a user interface that allows a user to access previously authored activity plans on a mobile device. An activity plan includes one or more activity items, in which each activity item includes at least a title and description. The system then receives a user selection of an activity plan. Subsequently, the system obtains the activity plan from a database storing the previously authored activity plans and presents the activity plan to the user on the mobile device.

In a variation on this embodiment, each activity item includes at least one of an equipment listing, an associated video, and a category. In addition, each activity item is assigned to at least one category and the system also receives user input to specify at least the title, the associated video, and the category for a new activity item. The system stores the new activity item with the title, the associated video, and the category in the database on the mobile device.

In a variation on this embodiment, each activity item is associated with a category, and the system receives user input to select an activity plan template. In addition, the activity plan template specifies a specific category for each schedule bubble of a new activity plan. The system displays one or more schedule bubbles. Each schedule bubble represents a block of time and each schedule bubble is displayed with an associated category in accordance with the activity plan template. The system receives user input to select a particular schedule bubble that displays a particular category. The system displays one or more activity items that belong to the particular category. Then, the system receives user input to assign at least one activity item belonging to the particular category to the selected particular schedule bubble. The system stores, in the database on the mobile device, data that represents the new practice plan with the assignment of at least one activity item to the selected particular schedule bubble.

In a variation on this embodiment, the system displays, on a portion of a screen of the mobile device, a library interface. The library interface displays at least one activity item. Then, the system displays, on a separate portion of the screen of the mobile device, a plurality of schedule bubbles. Each schedule bubble represents a block of time. The system receives user input to associate an activity item from the library interface with at least one of the plurality of schedule bubbles. Subsequently, the system stores, in the database on the mobile device, a practice plan that includes the association of the activity item with at least one of the plurality of schedule bubbles.

In a variation on this embodiment, the system receives user input specifying a time duration for each schedule bubble of a new activity plan and a total practice time for the new activity plan. Each schedule bubble represents a block of time. Subsequently, the system receives at least one user input to assign an activity item to a schedule bubble of the new activity plan. The system then adds the activity item to the new activity plan in the database on the mobile device.

In a variation on this embodiment, the system receives user input to select an activity item from the activity plan. The activity item is associated with one or more video clips. Furthermore, the system plays a video clip from the one or more video clips on the mobile device.

In a variation on this embodiment, the system displays the activity plan as a sequence of schedule bubbles. Each schedule bubble represents a block of time. Each schedule bubble is associated with one or more activity items. The system receives user input to select a particular activity item associated with a particular schedule bubble. Subsequently, the system displays a new window with at least one link to a video clip, an activity item usage count, and an activity item most recent usage date. The information is displayed for the particular activity item associated with the particular schedule bubble.

In a variation on this embodiment, the activity plan is a practice plan for a sport. The system displays a print preview screen with a schedule of times associated with each activity item. Each activity item is a practice drill activity item. Furthermore, one or more of the activity items include equipment data for executing the practice drill. The system receives user input to select a particular activity item, and displays a diagram of a court associated with the selected particular activity item.

In a variation on this embodiment, the activity plan is a practice plan for a sport.

BRIEF DESCRIPTION OF THE FIGURES

FIG. 5A presents a diagram illustrating an exemplary pop-up window for a library title menu, according to an embodiment.

FIG. 5B presents a diagram illustrating the exemplary library interface displaying drills saved under a category title, according to one embodiment.

FIG. 10 presents a diagram illustrating exemplary contents of a print preview screen with breakdowns of practice times for each drill, according to an embodiment.

FIG. 11 presents a diagram illustrating exemplary contents of the print preview screen with diagrams of courts, according to an embodiment.

In the figures, like reference numerals refer to the same figure elements.

DETAILED DESCRIPTION

Figure 1A:
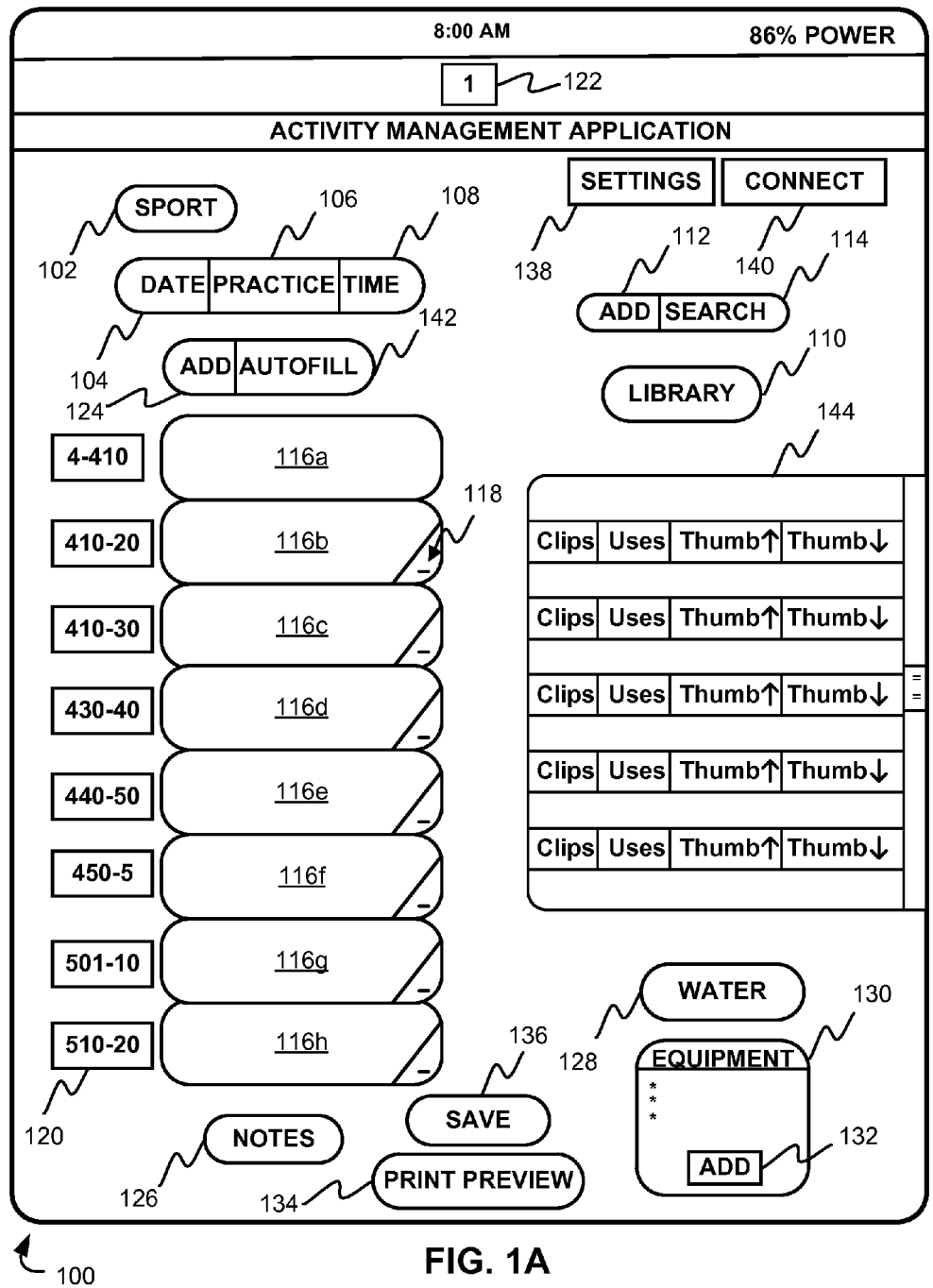
FIG. 1A presents a diagram illustrating an exemplary main screen of a user interface for creating and managing activity plans, according to an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of disorganization in creating and managing activity plans by providing a platform for users to design, share, and store activity plans. Embodiments of the present invention provide a computer user interface and framework for creating and sharing activity plans. Users have the capability to author, change, buy, share, or sell an activity plan and/or an activity item through online services. A software application implements a number of the innovative techniques discussed herein. The software and system allows users to create, download, or share activity plans, and the user can put together the activity plans with activity items. With this application, a coach of any sport can create an intricate practice plan. The activity management application serves as an interactive database of drills and practice ideas that allows coaches to quickly create comprehensive practice plans. It also allows coaches to create a drill management and coaching tool that is easily accessible.

Activity Plans

An activity plan can be described as an interactive schedule. The activity plan is usually designed to achieve a particular goal. For example, the coach may design and utilize an activity plan to improve athletes' performance. The contents of an activity plan includes one or more activity items. An activity item can be described as a focused collection of related information designed to enhance a specialized skill or technique, or to achieve a specific task. Activity items can include multimedia clips, textual descriptions, categorical data, key point summaries, purpose statements, and other data.

Activity plans (e.g., practice plans for athletes) may include a list of various activity items (e.g., practice drills for techniques used in sports). Users may efficiently (e.g., with one finger swipe) populate an activity plan with activity items, thereby easily creating activity plans. The system can maintain a library of activity items for the user in a database. The system can also store a series of practice plans for coaches to help their athletes achieve overall goals. Users may plan out a series of practices over a period of time. In this disclosure, activity plans may also be referred to as schedules. A practice plan may also be referred to as a practice schedule.

In one implementation of the user interface, an activity plan is represented by one or more sequential schedule bubbles. A single schedule bubble represents a time interval (e.g., a block of time) that can be allocated for one or more activity items. A practice schedule may include multiple schedule bubbles displayed to the user, each schedule bubble including one or more practice drills. A library in a database also stores activity items and activity plans. An activity item from the library may be represented in the user interface by a single activity item bubble. The activity item bubble encapsulates all aspects of the activity item, including notes taken at a practice clinic, recorded videos, downloaded videos, key points, equipment listing, and other information.

The library and activity plans are available where needed the most, which is at practice locations. Users may take the activity plans to the field and have the activity plans and library available in the field, where the users may conveniently consult and dynamically update the activity plans/activity items. At a practice event, coaches can videotape a drill, add notes with a description, and immediately save a copy of a practice plan/drill in the library.

Users can share or sell practice plans through an online store. They can buy, sell, and/or download previously authored practice plans through the online store. Users can go to an online store and browse for specific drills. Users can purchase drills from the store, and such stores can have drills organized by sport. Users can obtain drills and/or practice plans and take information to practices. Users can integrate the practice and drill information into their customized practice plans.

The activity plans disclosed herein can be for any type of activity. In this disclosure, each sport is a different activity, practice plans for sports are discussed in detail as representative activity plans, and practice drills for sports are representative activity items. However, the activity plans and activity items can be for any type of activity. For example, the activity plans and activity items can be adapted for a television schedule, a school schedule, an outdoor expedition schedule, or a collection of recipes for a multicourse meal.

In various implementations, teachers who teach several subjects may use an adapted application to store and create lesson plans for their instruction activities. The format and functionality of the application can be the same, but the content is for teaching plans in several grade levels and/or disciplines. Further, various aspects of the present invention may also be implemented on other platforms, such as an iPhone®. For example, the library as described herein may also be made available through an application executing on the iPhone®. Users may also conveniently access their activity plans and activity items on the iPhone®.

Other embodiments of the invention also include generating performance reports for each athlete with respect to particular drills. For example, the system can generate performance reports for a three month period for a 1-mile run. Further, users may send a schedule of their workouts to other users. A receiving user can view the schedule bubbles fill up with drill information for a received workout. In various implementations, the workout schedule may be added as a read-only reference practice plan to the receiving user's stored set of practice plans. Users may share activity items by inputting the recipient's cell phone number, e-mail address or other personal identifier or address. The sharing of activity items can also be limited so that the receiving user cannot further share the activity item and/or the sharing is only possible for a certain number of times. Sharing can also be limited so that only the user who creates an activity item can share the activity item.

Computing Environment

FIG. 1A presents a diagram illustrating an exemplary main screen 100 of a user interface for creating and managing activity plans, according to an embodiment. The activity management application embodies a number of the techniques described herein as adapted for sports coaching, and various aspects of the invention are described below with respect to practice plans and drills for sports coaching and training The main screen 100 of the user interface displayed on a portable computing device (e.g., iPAD®) includes a sport button 102. A user (e.g., a coach) may choose a sport for creating practice plans and drills by selecting the sport button. On a touchscreen portable computing device, the user may select sport button 102 by touching sport button 102. The user may view the date for the practice plan currently displayed at a date graphical user interface (GUI) element 104. The date GUI element 104 may also operate as a selectable date button. The user may operate (e.g., by selecting with a finger) the date element 104 to select a date from a pop-up calendar. Practice plans associated with the selected date may then be displayed on the main screen. A practice GUI element 106 can display a practice counter or operate as a practice number selector. The user may choose a practice number by selecting the practice GUI element 106, which causes a pop-up practice number selection window to display. Users may set practice times and/or practice time intervals using a time button 108.

Users can choose to view a number of categories of drills by selecting a library button 110. Upon detecting user selection of library button 110, the system displays a library window to allow the user to select a particular category title from different categories of drills. Users can also add additional drills by selecting an add button 112. A search button 114 allows searching for drills from a database of drills. Users can fill one or more schedule bubbles 116*a*-116*h* with drills to create a practice plan (eight schedule bubbles 116*a*-116*h* are depicted in FIG. 1A). Users can remove a schedule bubble from the practice plan by selecting a respective minus button 118 displayed on each schedule bubble. Each of eight respective time allotments (shown to the left of each schedule bubble) displays the time interval for each respective schedule bubble. For example, time allotment 120 displays the time interval for schedule bubble 116*h*. A practice number 122 indicates the particular practice plan that the user is viewing. The user can select an add button 124 to add additional schedule bubbles. Such additional schedule bubbles may be added to the bottom of the schedule by default. The user can also select a notes button 126 to add notes at the beginning or end of a practice plan.

When a user selects a break button 128 (illustrated as "water" in FIG. 1A), the system automatically adds time for a water break to the schedule. An equipment box 130 automatically displays the equipment for executing a drill that a user drags into a schedule bubble. The user may also manually add equipment by selecting an add equipment button 132. Furthermore, the user may select a print preview button 134 to view a breakdown of practice times associated with each drill of the practice plan. Additionally, selecting a save button 136 will save the practice information associated with the current practice number being viewed.

The user may change various settings by selecting a settings button 138. Furthermore, the user may also connect to a related website or other Internet service by selecting a connect button 140. Practice templates, drills, and other activity information may be purchased, sold, or otherwise shared through such websites. The user may also select an autofill button 142 to choose a practice template. The system then populates the schedule bubbles with drill category titles in accordance with the practice template. The user can choose particular drills through the library interface 144, which is automatically filled with drills for a chosen category title, in order to fill in the schedule bubbles. Library interface 144 displays a selected set of the information stored in the library, and the library also stores other practice information such as drills and sets of practice plans. Library interface 144 may be connected to a backend storage component that temporarily stores some of the drill data from the library (e.g., see FIG. 14). Each of the elements of the user interface, and functionality of various components associated with the elements, are discussed in further detail with respect to the remaining drawings.

Note that users may select items on the screen using any method. Selection techniques include touching the item with a finger or stylus, or clicking on the item with a mouse, or speaking aloud (e.g., reading aloud the text label on a button), depending on the implementation in various devices. Furthermore, the user interface may be implemented as part of an application executing on a portable device, such as the iPad® from Apple Inc.

Figure 1B:
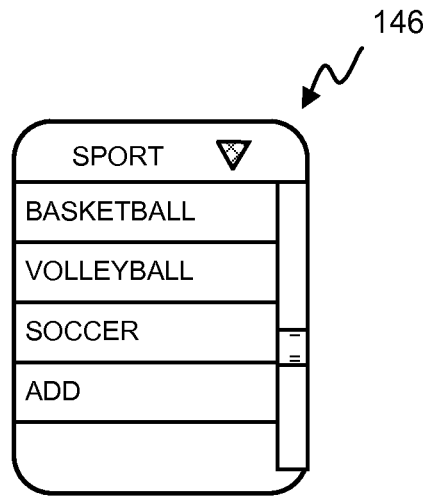
FIG. 1B presents a diagram illustrating an exemplary sport/activity pull-down menu, according to an embodiment.

FIG. 1B presents a diagram illustrating a sport/activity pull-down menu, according to an embodiment. A user may select the sport button 102 (FIG. 1A), which causes the system to display a drop-down menu 146. The drop-down menu may display several sports. The purpose of the sport button is to allow the user to select a sport for creating practice plans. For example, the drop-down menu may include sports or activities such as basketball, volleyball, soccer, baseball, volleyball, judo, lacrosse, boxing, badminton, P.E class, or dance. In some embodiments, the sport that the user chooses on first use is saved as the sport for practice plans until the user manually changes the sport selection again.

Figure 2:
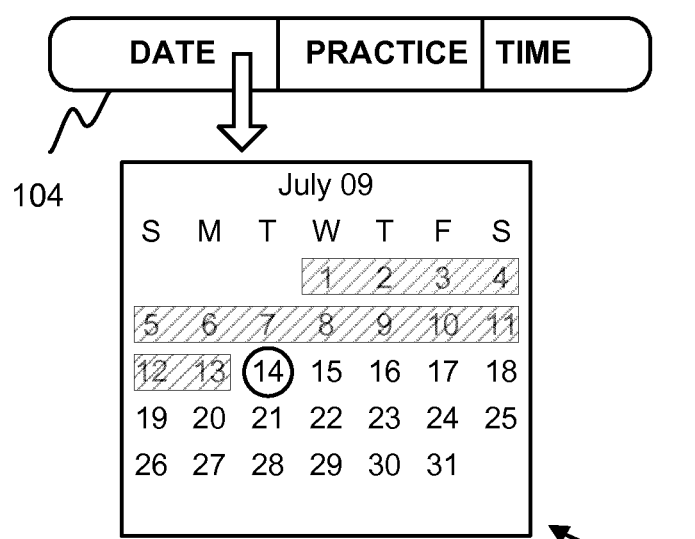
FIG. 2 presents a diagram illustrating an exemplary pop-up calendar to select a practice plan date, according to an embodiment.

FIG. 2 presents a diagram illustrating an exemplary pop-up calendar 200 to select a practice plan date, according to an embodiment. A user may select the date button 104 (FIG. 1A), which causes the system to display the pop-up calendar 200. The current date is automatically displayed in a circle, as illustrated in FIG. 2. However, the user may change the date manually (e.g. to build a practice plan for a future date) by selecting a date on the pop-up calendar. The pop-up calendar has past dates shaded and future dates can be non-shaded and selectable, in order to allow the user choose a date in the future.

Figure 3:
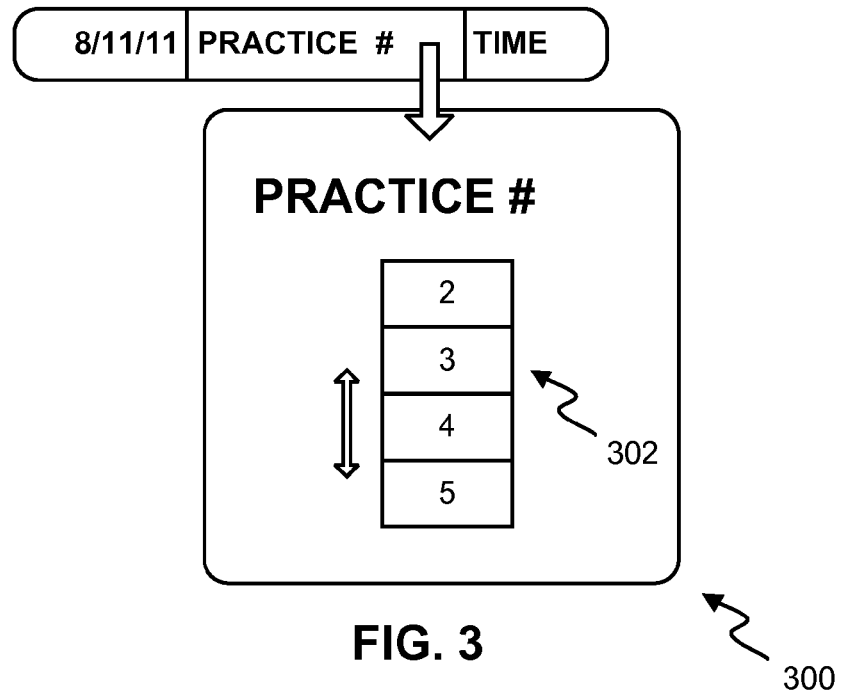
FIG. 3 presents a diagram illustrating an exemplary pop-up practice plan number selection window, according to an embodiment.

FIG. 3 presents a diagram illustrating an exemplary pop-up practice plan number selection window 300, according to an embodiment. The practice GUI element 106 (FIG. 1A) can be a practice counter automatically displaying a consecutive practice number. When the user selects the practice counter, the system displays a pop-up practice number selection window 300 within which the user can roll up or down to choose a future practice number 302 (e.g., any one of "2," "3," "4," or "5" illustrated in FIG. 3) to build a practice plan for a future date.

Figure 4:
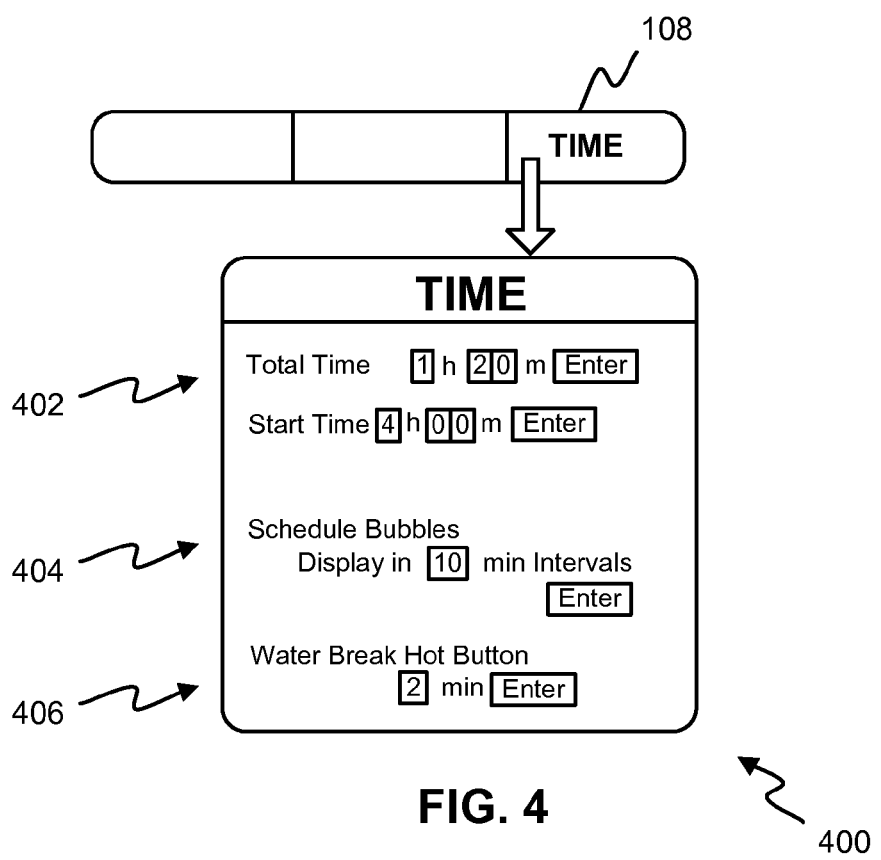
FIG. 4 presents a diagram illustrating an exemplary window for setting practice times, according to an embodiment.

FIG. 4 presents a diagram illustrating an exemplary window 400 for setting practice times, according to an embodiment. The time button 108 (FIG. 1A) feature allows the user to set practice times automatically (e.g., 80 minutes) in specified intervals (e.g., 10 minutes) or set and/or select specific practice times. To set his or her own practice times or practice time intervals (e.g., time duration for schedule bubbles), the user may pull down the time menu window 400 and specify a time for practice and/or change the intervals for practices. A section 402 gives the user an option to enter a total time for practice in hours and minutes and the start time. For example, the user may enter the total time as 1 hour and 20 minutes. The user may also enter the starting time as 4:00. A section 404 allows the user to choose to display the time in intervals of a specified number of minutes. In one embodiment, this button is pre-set to 10 minute intervals unless the user changes it. A section 406 specifies time parameters for a water break hot button. The user may specify the duration of the water break. The water break hot button can be preset to 2 minutes by default.

Note that if the user sets the interval time to 10 minutes and chooses a 60 minute practice, then six schedule bubbles would appear in the main screen. If the user wants to have a 30 minute practice instead of a 60 minute practice the user can select the minus button located in the lower right hand corner of each schedule bubble and delete three of the six 10-minute bubbles. Alternatively, when the user sets the time, the user can select 30 minutes as the practice time, as discussed above.

Library of Activity Items

FIG. 5A presents a diagram illustrating an exemplary pop-up window 500 for a library title menu, according to an embodiment. The user may select the library button 110 (FIG. 1A) to view category titles from a database of activities and drills. When the user selects the library button 110, a window pops up and displays the title of all categories of drills that the user has stored in the database. For example, if the user selects a category title "Warm up" 502, then the system determines all the drills stored under the "Warm up" category. The library interface 144 (FIG. 1A) displays all the drills stored under the "Warm up" category, as illustrated in FIG. 5B.

The library is part of the database where the user accumulates and stores activities and drills for building practice plans. The library and library interface 144 is where the main content of the application and/or system is entered and stored. The database is created either manually by entering data or by uploading and/or downloading content using the connect button 140 (FIG. 1A). The drills may be stored in the database under the various category titles.

Figure 5C:
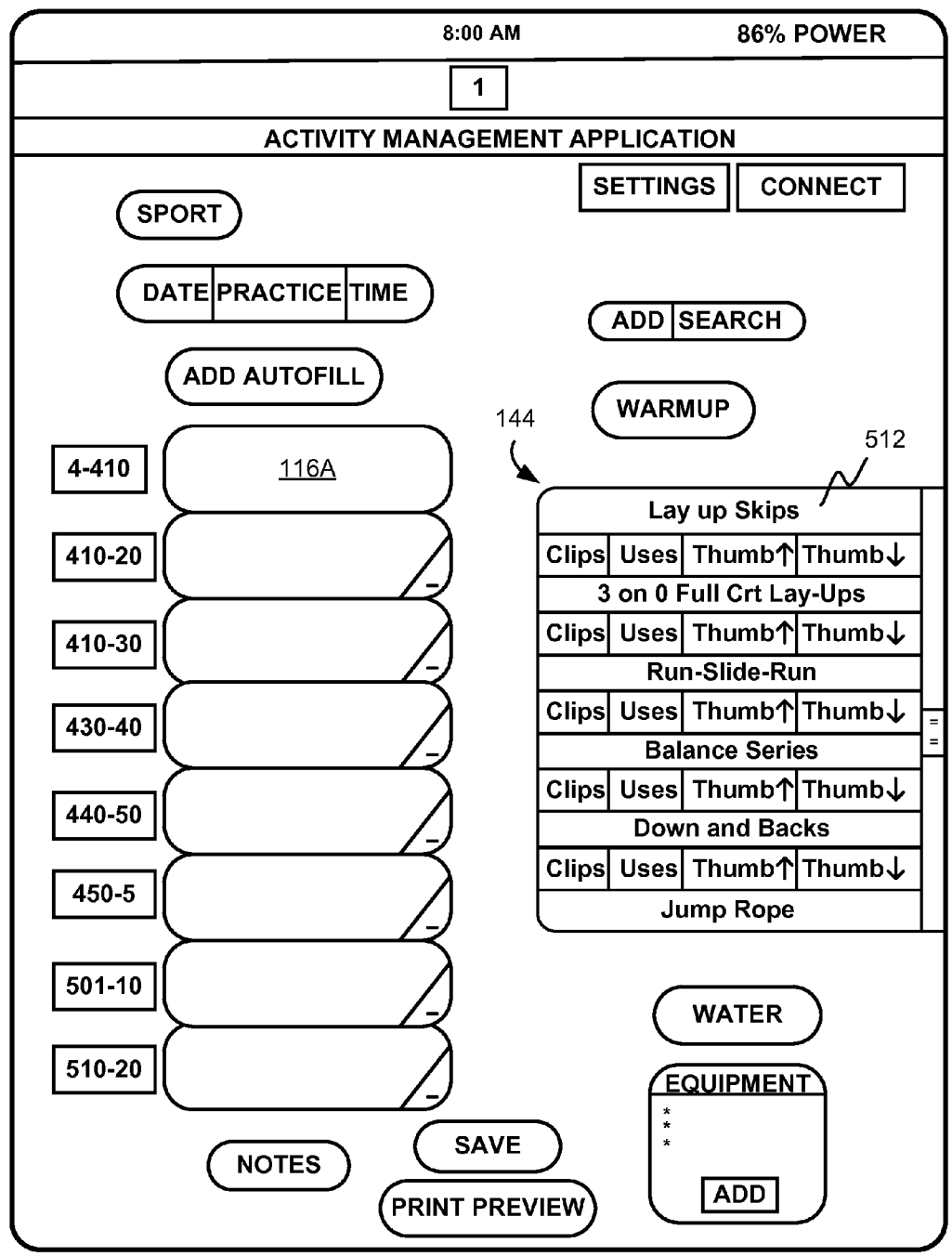
FIG. 5C presents a diagram illustrating the exemplary library interface within the context of the main screen user interface, according to an embodiment.
Figure 5D:
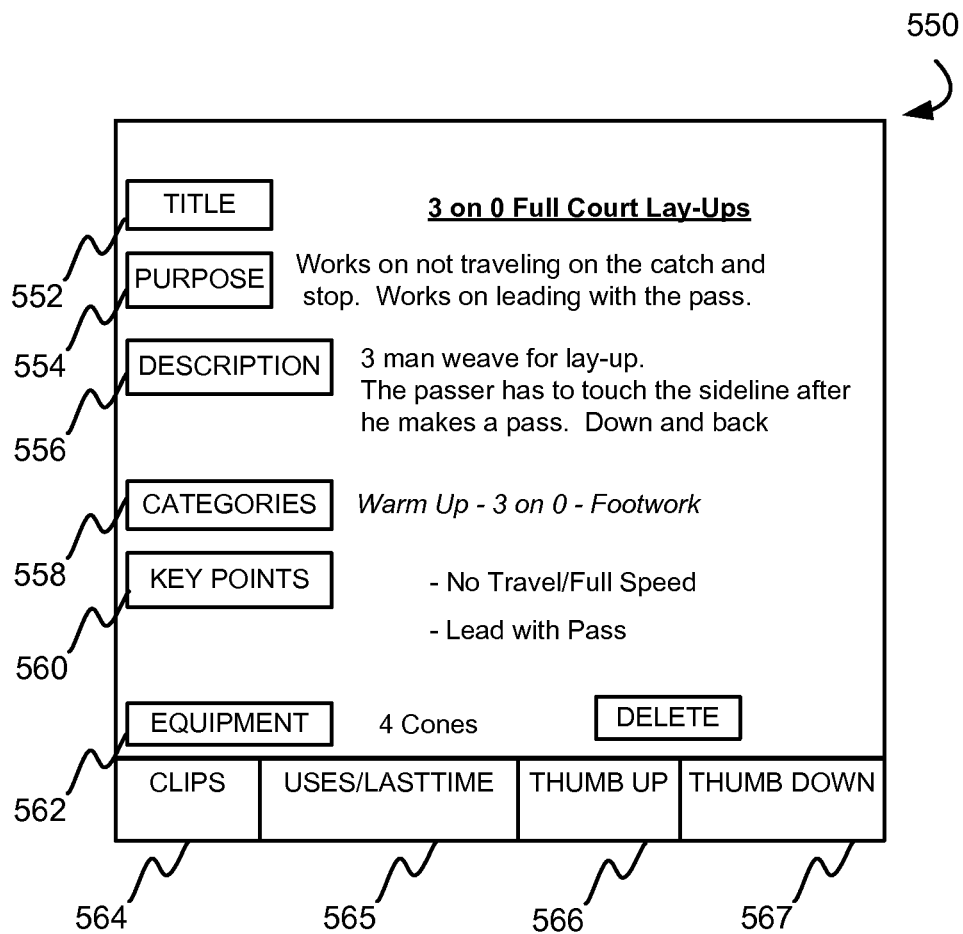
FIG. 5D presents a diagram illustrating an exemplary pop-up window for viewing, adding, or editing drill details, according to an embodiment.
Figure 7A:
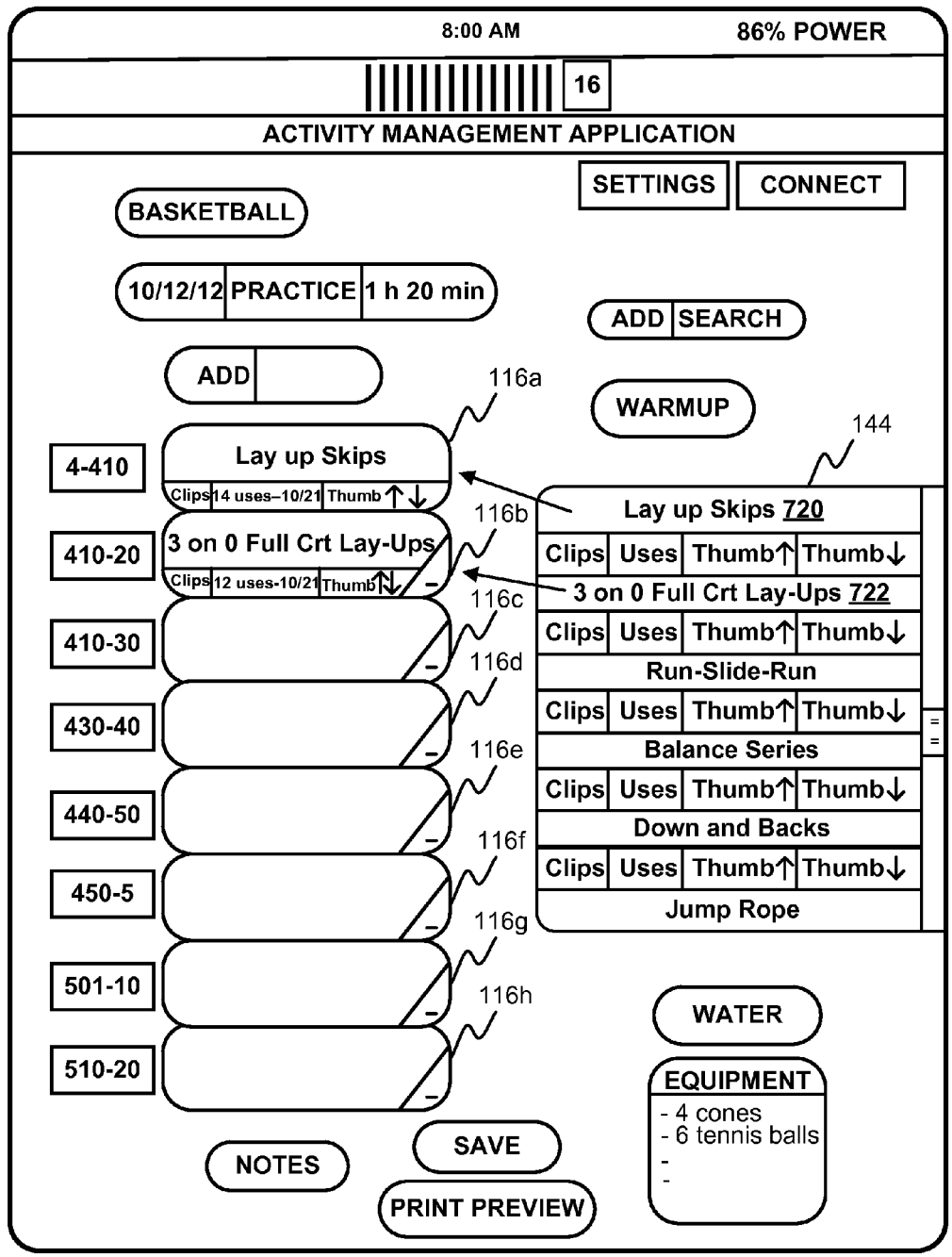
FIG. 7A presents a diagram illustrating an example of dragging an activity item from the library interface to a schedule bubble, according to an embodiment

FIG. 5B presents a diagram illustrating the exemplary library interface 144 displaying drills saved under a category title, according to one embodiment. FIG. 5C presents a diagram illustrating the exemplary library interface 144 within the context of the main screen user interface 100, according to an embodiment. For example, if the user selects "Warm up" 502 in the Library Title Menu (FIG. 5A), then all the drills stored for "Warm Up" are retrieved from the database and displayed (e.g., see FIG. 5B and FIG. 5C). The user may scroll up and down to see which drills to choose assign to a practice plan (e.g., by sliding the drill over to the practice plan). Then, the user can use a finger to press on the drill(s) of choice and drag the drill(s) to the schedule bubbles, as illustrated in FIG. 7A. For example, the user may drag the drill labeled "Lay Up Skips" to a schedule bubble 116A. The user may get more information about each drill by selecting the drill and a window as illustrated in FIG. 5D pops up. Note that at any time that a user is viewing a drill, the user may select the drill and share the drill with others. For example, in response to a user's drill selection, a pop-up menu may appear through which the user can select recipient e-mail addresses or phone numbers.

FIG. 5D presents a diagram illustrating an exemplary pop-up window 550 for viewing, adding, or editing drill details, according to an embodiment. Here, as illustrated in FIG. 5D, the user may author drills and store the drills in the database. The user may input drill data by filling out or editing the title 552, purpose 554, description 556, drill categories 558, key points 560, and equipment 562 of the drill.

The user may fill out each of these categories to provide a detailed description of the drill. The key points section 560 records what the user is trying to accomplish with this drill. For example, for a "3 on 0 Full Court Lay-Ups" drill, the key points are "no travel/full speed" and "lead with pass." The equipment section shows what equipment is needed for each drill. Note that a drill can be categorized under more than one category.

The bottom row of the window illustrated in FIG. 5D are buttons. The buttons can be labeled as "clips," "uses/lasttime," "thumb up," and "thumb down." Users may select a clips button 564 to view video clips associated with the drill. A uses/lasttime button 565 allows the user to view cumulative drill usage data and the most recent date that the drill has been used. A thumb up button 566 and a thumb down button 567 each allow the user to enter a rating for the drill. In some variations, hyperlinks may also be displayed on top of the clips button. Users can select the hyperlinks to view additional information regarding the video clips.

The user may alternatively store drill content by purchasing a code to download the drill information. Upon entering the code, the system will automatically enter specific drill information into the window illustrated in FIG. 5D. The drills are stored with the database and form part of the library that the user accumulates. After the user downloads or inputs content to create a database of drills, the drills may be dragged to schedule bubbles in a displayed schedule, thereby creating practice plans.

Figure 5E:
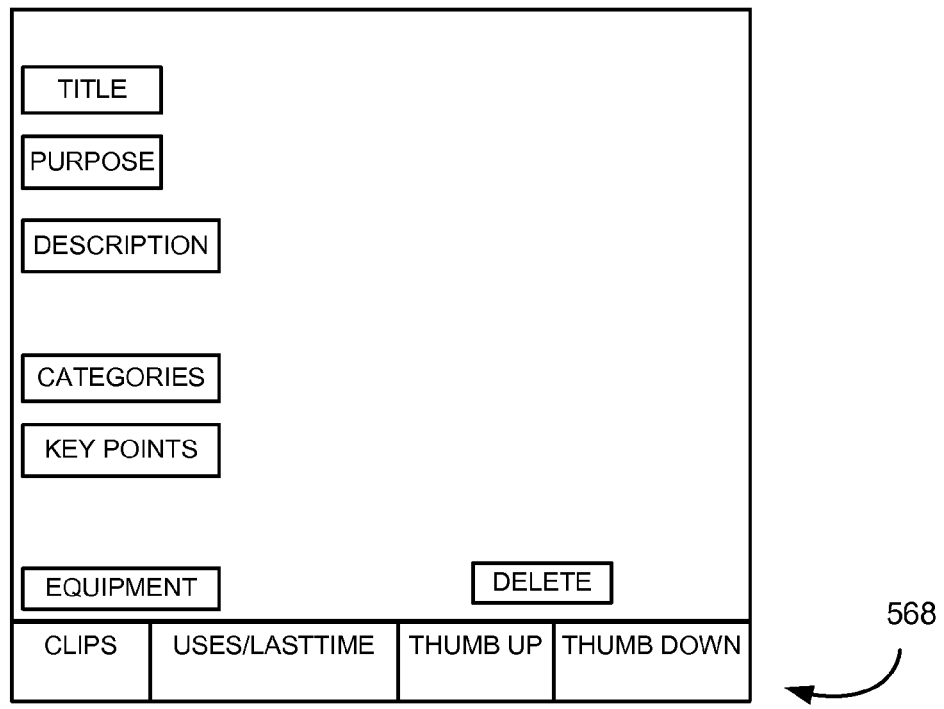
FIG. 5E presents a diagram illustrating an exemplary blank pop-up window for inputting drill details, according to an embodiment.

FIG. 5E presents a diagram illustrating an exemplary blank pop-up window 568 for inputting drill details, according to an embodiment. When a user presses the add button 112 (FIG. 1A), a blank version of the window illustrated in FIG. 5D pops up, as illustrated in FIG. 5E. The user may then enter new drill information using the blank pop-up window 568.

Figure 5F:
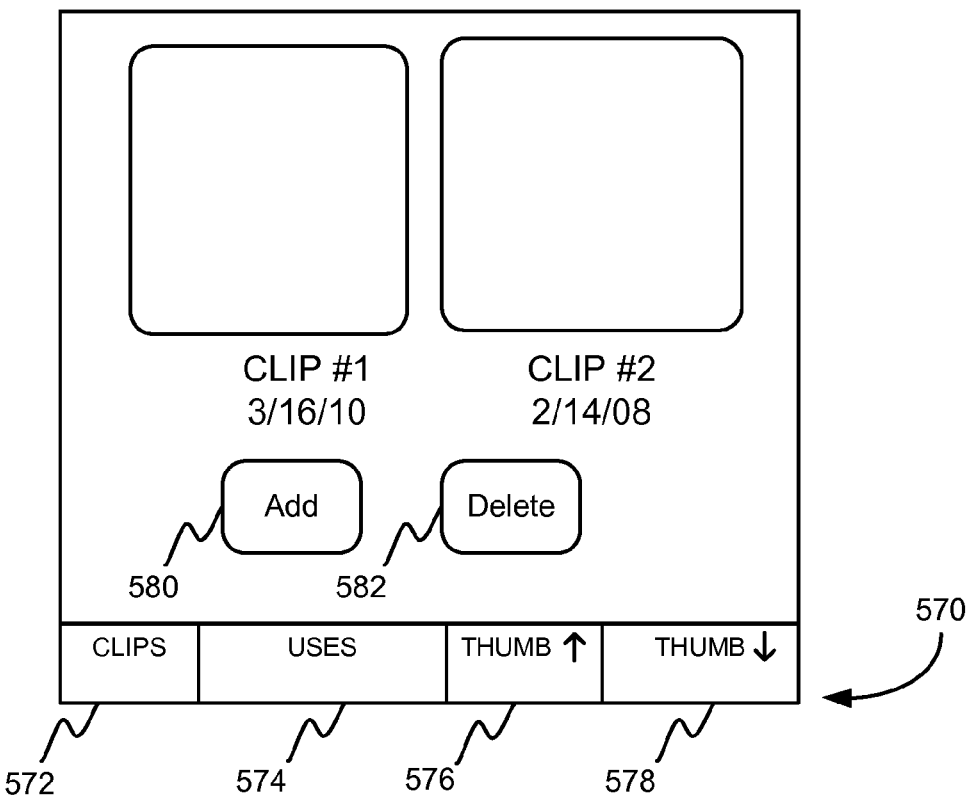
FIG. 5F presents a diagram illustrating an exemplary pop-up window for viewing clips, according to an embodiment.

FIG. 5F presents a diagram illustrating an exemplary pop-up window 570 for viewing clips, according to an embodiment. The user can view one or more clips the user has uploaded/downloaded from sources such as film or video software, the Internet, or a flash drive. These video clips are part of the drill. When the user presses the clips button 564 (FIG. 5D), the window 570 pops up if there is a library of previously stored clips, with displayed add clip button 580 and delete clip button 582. The user may choose either to view a previously stored clip or add or delete a clip. A uses section 574 at the bottom can display how many total uses the user has (e.g., 25 uses). A thumb up button 576 and a thumb down button 578 are part of a rating system which allows the user to rate the drills and/or video clips. Aggregate community ranking data may be displayed with the drills so that each user can evaluate the popularity of the drill. In some implementations, users can annotate the video clips with notes. Such notes may help improve training of athletes at practice.

Figure 6:
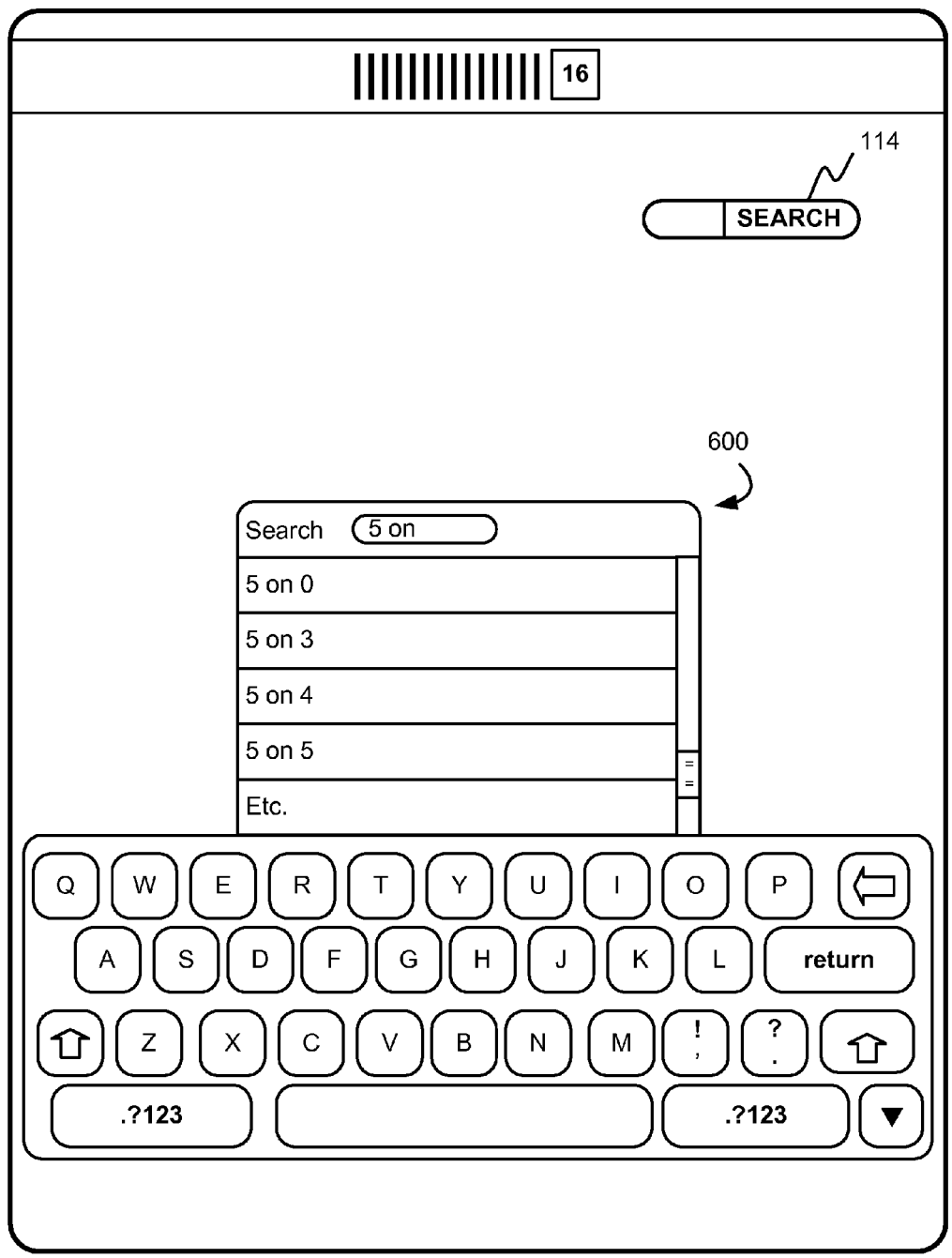
FIG. 6 presents a diagram illustrating an exemplary pop-up window to search for drills, according to an embodiment.

FIG. 6 presents a diagram illustrating an exemplary pop-up window 600 to search for drills, according to an embodiment. When the user presses the search button 114 (FIG. 1A), a window 600 pops up and allows the user to type in words that will automatically trigger keyword searches to find a drill.

Associating Activity Items with Schedule Bubbles

FIG. 7A presents a diagram illustrating an example of dragging an activity item from a library interface 144 to a schedule bubble, according to an embodiment. The screen 100 is an example of main screen 100 (FIG. 1A) where a sport has been selected (e.g., basketball) and other sections of the screen are also displaying practice data. The user can take drills that s/he has authored or acquired in his or her library and fill the practice schedule's schedule bubbles 116a-116h to create a comprehensive practice plan. The user can drag an activity item (e.g., practice drill) out of the library interface 144 into a schedule bubble, thereby associating the schedule bubble with the activity item in the database. For example, the user can drag an activity item "Lay up Skips" 720 over from the library interface 144 to fill the first 10 minute schedule bubble 116a. The user can also drag an activity item "3 on 0 Full Crt Lay-Ups" 722 over from the library interface 144 to fill the second 10 minute schedule bubble 116b. In some embodiments, the system stores associations between the schedule bubble and the activity item in the database on the mobile device.

Figure 7B:
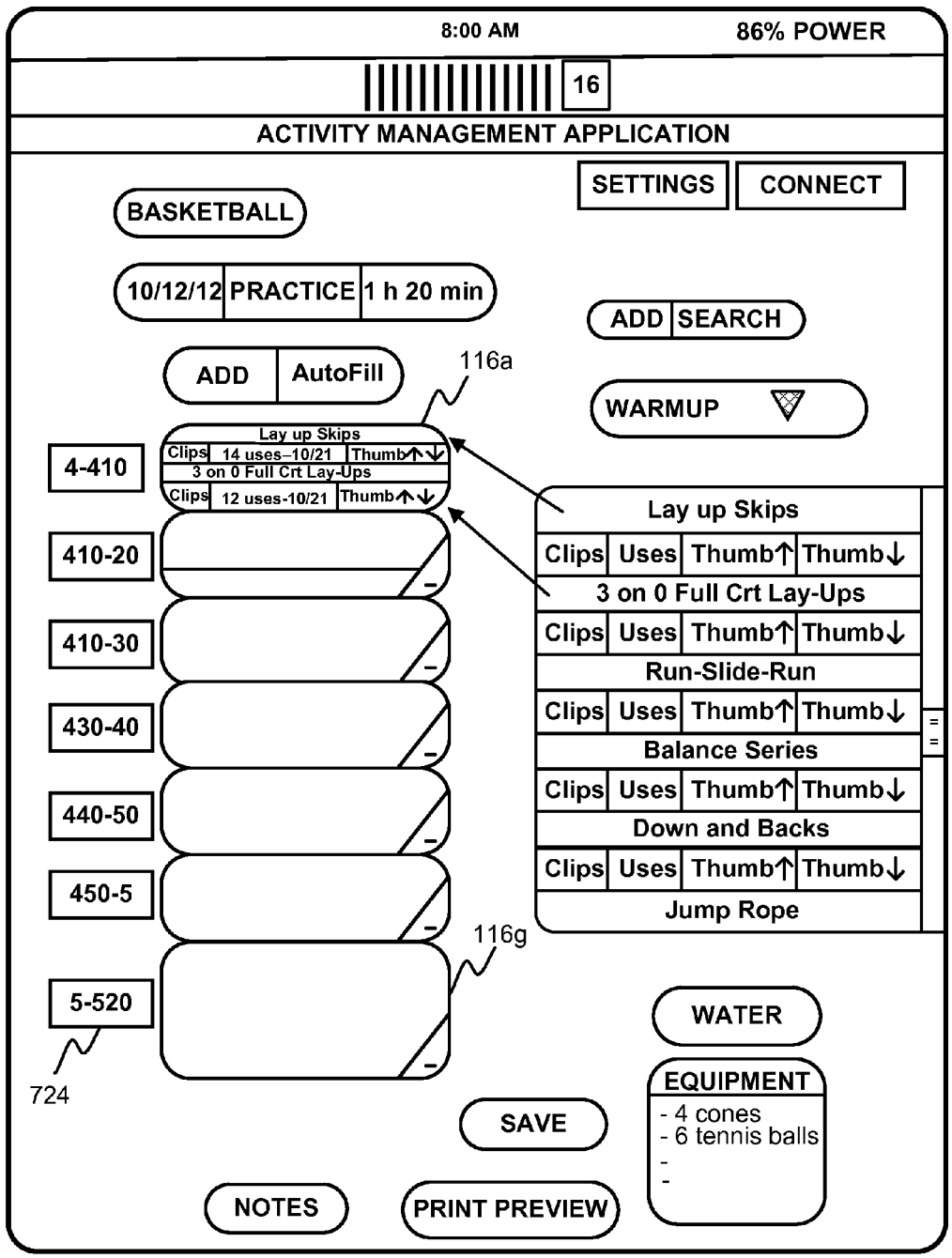
FIG. 7B presents a diagram illustrating an example of dragging more than one activity into a single schedule bubble, according to an embodiment.

FIG. 7B presents a diagram illustrating an example of dragging more than one activity into a single schedule bubble, according to an embodiment. Users may drag more than one activity drill into a schedule bubble, such as schedule bubble 116a. If the user drags more than one activity drill into the same schedule bubble (e.g., a 10 minute schedule bubble), then the schedule bubble is automatically divided into two parts (e.g., 5 minutes for each activity drill), thereby splitting the schedule bubble. In FIG. 7B, five minutes is allocated for "Lay up Skips" and five minutes is allocated for "3 on 0 Full Crt Lay-Ups."

FIG. 7B also illustrates an expanded schedule bubble 116g. If the user wants more time in a schedule bubble, the user can use his or her thumb and index finger to enlarge the schedule bubble. For example, the user can use two fingers to expand the width of a schedule bubble, resulting in the expanded schedule bubble 116g. The time associated with the expanded schedule bubble 116g increases and the time for the other schedule bubbles are also adjusted accordingly. Note that the user may also shrink the schedule bubble to decrease the time associated with the schedule bubble. For example, the user may pinch the schedule bubble using two fingers to shrink the schedule bubble, and the time for the other schedule bubbles are also adjusted accordingly.

FIG. 7B further illustrates multiple time allotments (e.g., time allotment 724) that each automatically adjust for the interval length of a respective schedule bubble. Each schedule bubble is displayed in FIG. 7B with an associated time allotment on the left side of the schedule bubble. The time allotments can be automatically set at pre-determined (e.g., 10 minute) intervals when the user first opens the program. When the user enlarges or shrinks a bubble (e.g., by using thumb and index figure), the time will automatically adjust for that schedule bubble. For an alternative way to adjust time allotments for schedule bubbles, see FIG. 4 and the accompanying description.

Figure 8A:
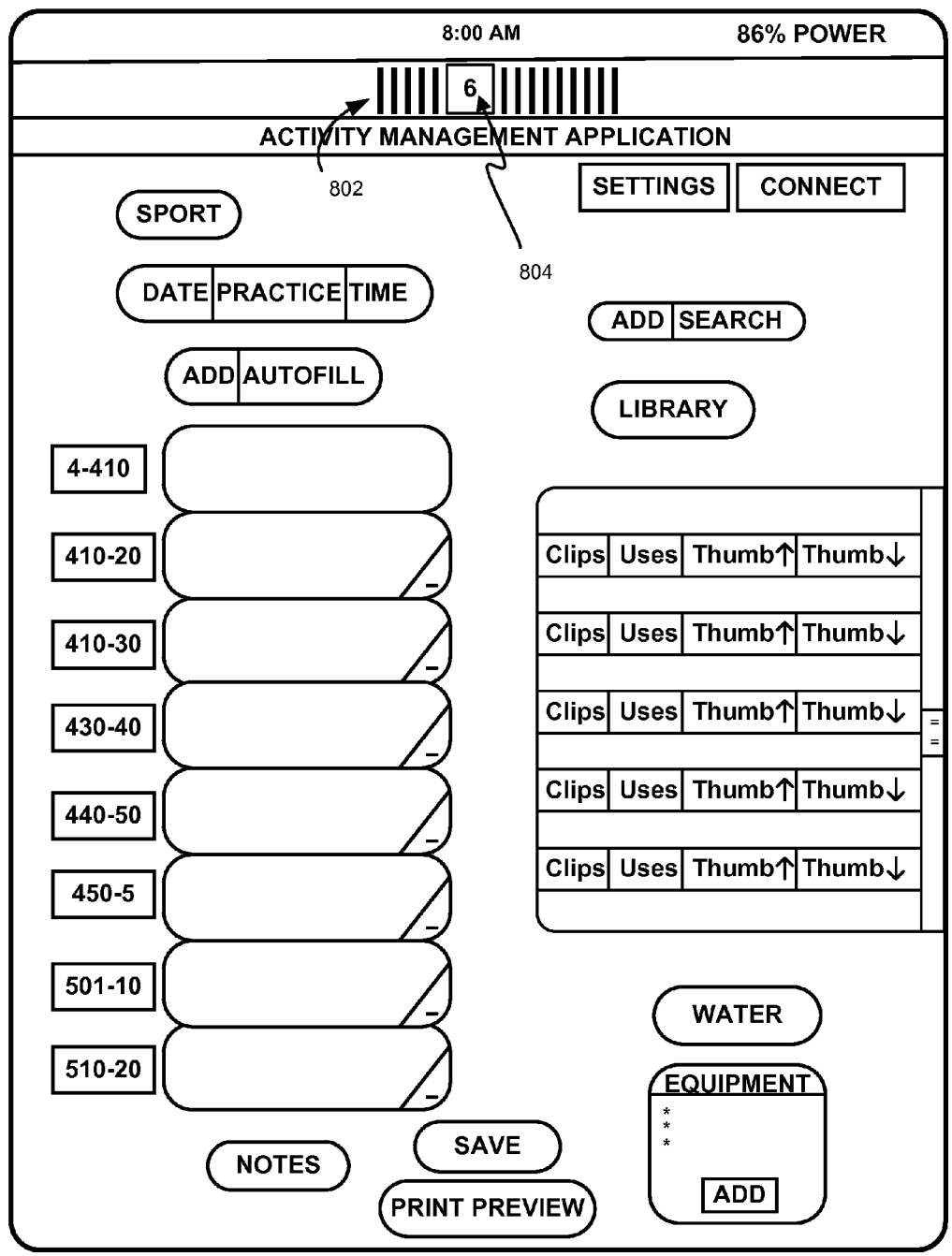
FIG. 8A presents a diagram illustrating exemplary practice numbers that pop up in response to user input, according to an embodiment.

FIG. 8A presents a diagram illustrating exemplary practice numbers that pop up in response to user input, according to an embodiment. Archived practices are displayed on the screen 100 in the form of lines 802. As the user selects (e.g., rolls finger over) each line, a number 804 pops up into a square illustrating the practice number represented by the currently selected line. The user may select a practice number as the user scrolls through the archived practices.

Abbreviated Practice Screen

Figure 8B:
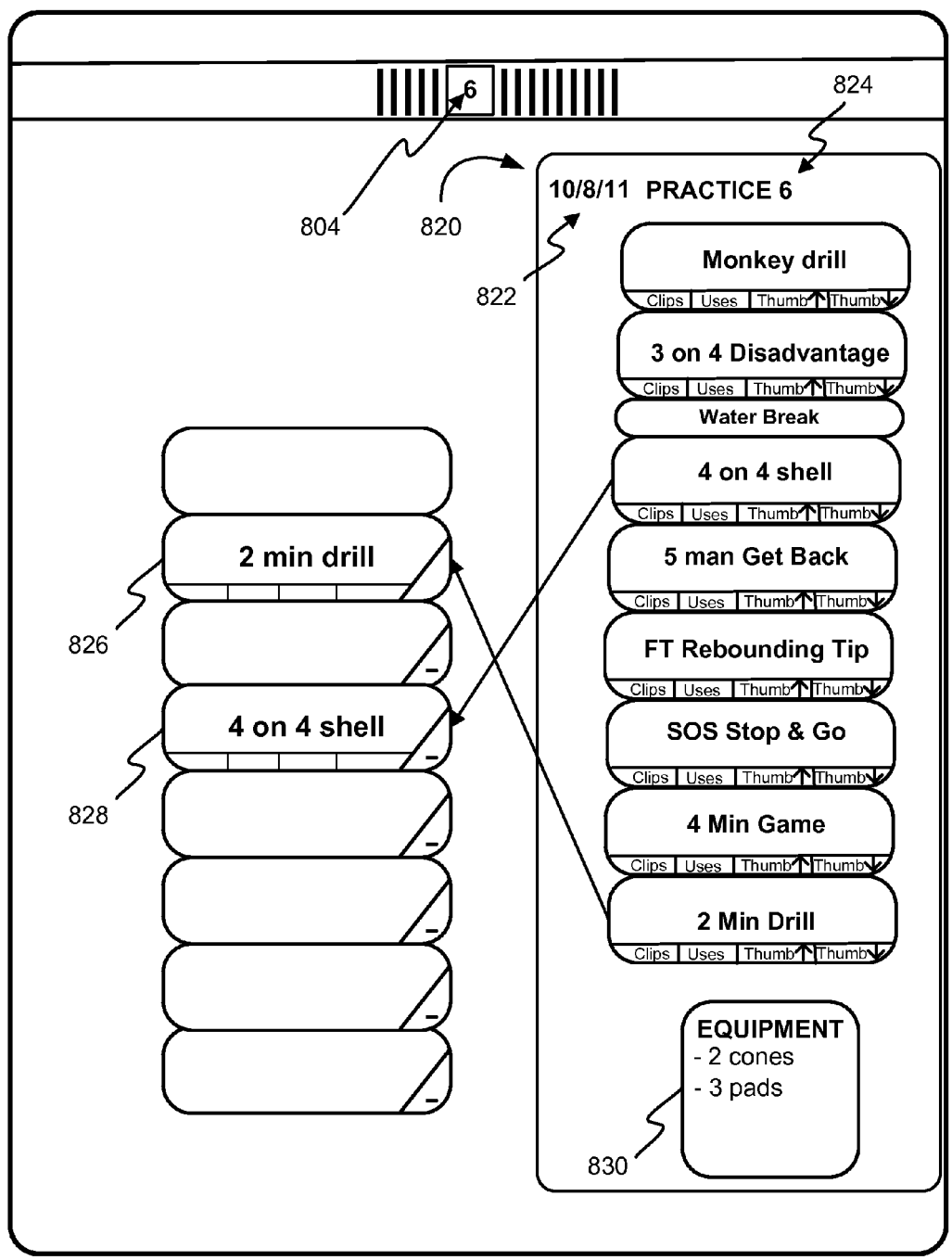
FIG. 8B presents a diagram illustrating an exemplary pop-up abbreviated practice screen displaying archived practices, according to an embodiment.

FIG. 8B presents a diagram illustrating an exemplary pop-up abbreviated practice screen 820 displaying archived practices, according to an embodiment. The user may select the desired archived practice number 804 to choose a particular practice plan. In one embodiment, the main screen dims when the user selects the number of the archived practice plan (e.g., practice plan number 6). The practice plan selected by the user pops up over the library window (e.g., illustrated in FIG. 5A) and displays an abbreviated practice screen 820 prepared for the date corresponding to the practice plan. The abbreviated practice screen displayed may include the following: the date 822, practice number 824, time (not illustrated in FIG. 8B), scheduled practice bubbles 826, 828 and equipment bubble 830. The user can then choose any of the previous practice drills and slide those into the current practice plan the user is building with the schedule bubbles.

Figure 9:
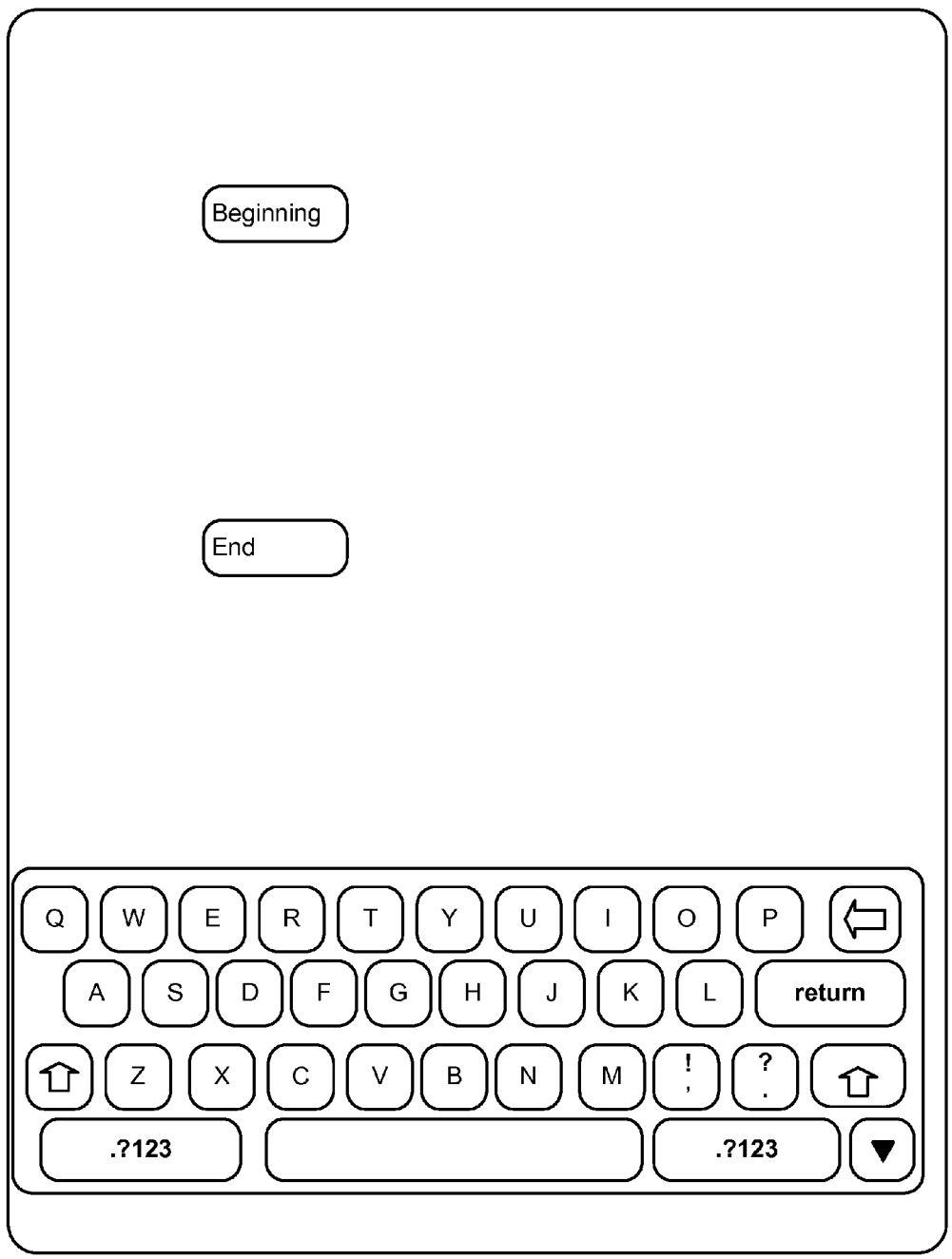
FIG. 9 presents a diagram illustrating an exemplary pop-up window for inputting notes, according to an embodiment.

FIG. 9 presents a diagram illustrating an exemplary pop-up window 900 for inputting notes, according to an embodiment. When the user selects the notes button 126 (FIG. 1A) a pop-up window appears. Selecting the notes button allows the user to add notes at the beginning or end of a practice plan. This way, the user can add notes while using the application program during training For example, coaches can store a log for each athlete's performance using the notes feature. Furthermore, the user can add notes prior to viewing the print preview section (see FIG. 11).

Print Preview Screen

FIG. 10 presents a diagram illustrating exemplary contents 1000 of a print preview screen with breakdowns of practice times for each drill, according to an embodiment. By selecting the print preview button 134 (FIG. 1A), another screen will pop up in which the user can see a breakdown of the practice times (e.g., "4:00-4:05" at time 1002) with each drill. The screen shows the user each drill that is selected for the practice plan, with the time allotted to each drill. The print preview page allows the user to create notes at the top 1004 of the practice print preview page as well as at the bottom (not illustrated) of the practice print preview page. Users may scroll up and down to view the entire practice print preview page.

The purpose of print preview is to show a blueprint of the practice plan. Once the user builds the entire practice plan in the main screen (e.g., FIG. 1A), the practice plan fills up all the schedule bubbles. The user can save the practice plan. The user can bring a tablet (e.g., iPad®) with the installed application to practice and reference the practice plan from the tablet application without printing a hard copy of the practice plan. Alternatively, the user can print the schedule out by selecting the print preview button 134 (FIG. 1A) and selecting print.

FIG. 11 presents a diagram illustrating exemplary contents of the print preview screen with diagrams of courts, according to an embodiment. There are two buttons next to each drill. One of the buttons (e.g., notes button 1102) allows the user to add notes to each drill. For example, a coach can write down preselected teams in the notes. Also, the user can select a court button (e.g., court button 1104). If the user selects the court button 1104, a diagram of a court (e.g., court diagrams 1106, 1108) will pop up. In some embodiments, the user can enlarge the pop-up diagram of the court to facilitate drawing and writing notes on the diagram. The user can diagram his or her vision of that play and/or drill for practice using the court diagrams. Note that the court button 1104 may be labeled according to the type of sport. For example, instead of being labeled "court," court button 1104 can be labeled with "field" for football or "pool" for water polo. In response to the user selecting court button 1104, the system displays pop-up diagrams appropriate for the specific sport. For example, a diagram of a football field can pop up when the user pushes court button 1104 labeled as "field." In another example, a diagram of a water polo pool can pop up when the user pushes court button 1104 labeled as "pool."

Figure 12:
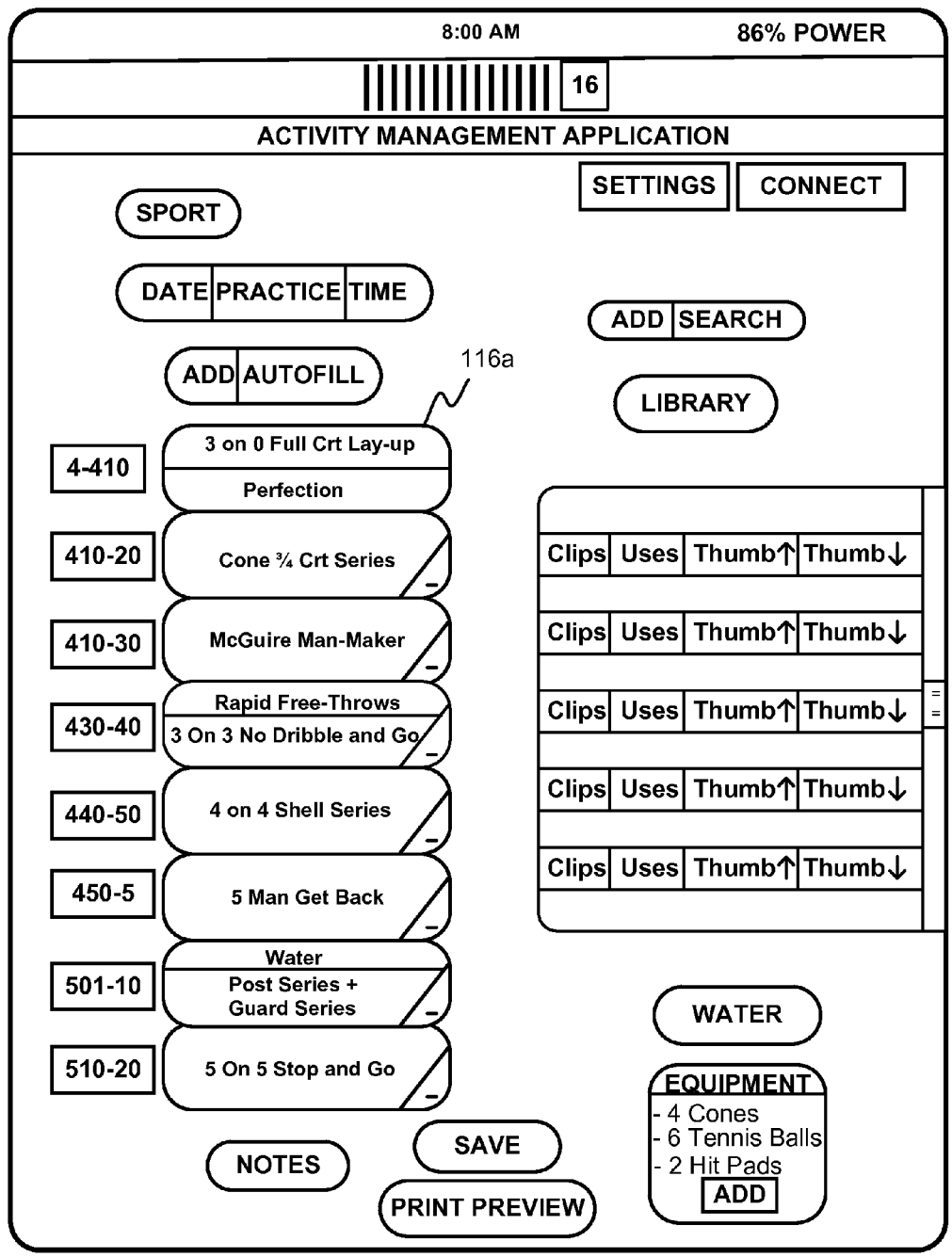
FIG. 12 presents a diagram illustrating the exemplary main screen of the user interface with filled schedule bubbles, according to an embodiment.

FIG. 12 presents a diagram illustrating the exemplary main screen 100 of the user interface with filled schedule bubbles, according to an embodiment. FIG. 12 illustrates an example of the main screen with all filled schedule bubbles, which a coach can take to show his or her team (e.g., as displayed on an iPad® with the activity management application installed). The schedule bubbles (e.g., schedule bubble 116a) each contain a drill from the practice plan number 16 illustrated in FIG. 11 and FIG. 10.

Autofill with Practice Plan Templates

Figure 13:
FIG. 13 presents a diagram illustrating an exemplary pop-up window for schedule bubble autofill, according to an embodiment.

FIG. 13 presents a diagram illustrating an exemplary pop-up window 1300 for schedule bubble autofill, according to an embodiment. The purpose of autofill is for the user to select downloaded products (e.g., practice plan templates) to fill the schedule bubbles. The downloaded schedule bubbles and library drills gives the user direction in formulating his or her practice plan. To begin with, the user would first press the autofill button 142 (FIG. 1A). The pop-up window 1300 appears once the user selects the autofill button 142. The user can choose from available downloaded packages, which can be purchased when connecting to a website through the connect button 140. For example, the user may click on "Indiana Practice Template." FIG. 14 illustrates examples of populated schedule bubbles for "Indiana Practice Template."

Figure 14:
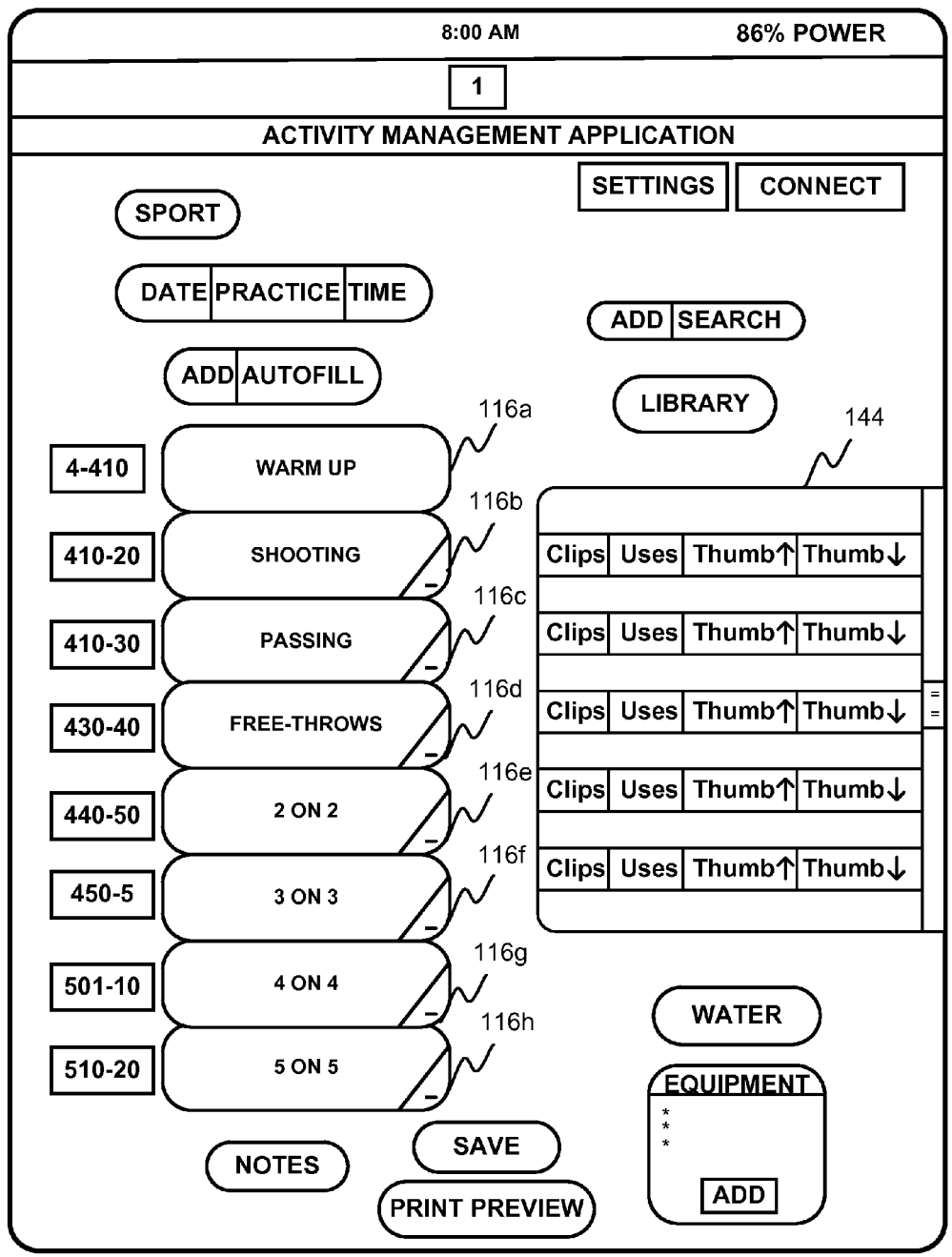
FIG. 14 presents a diagram illustrating exemplary schedule bubbles populated with pre-made practice templates, according to an embodiment.

FIG. 14 presents a diagram illustrating exemplary schedule bubbles populated with pre-made practice templates, according to an embodiment. After receiving user selection of "Indiana Practice Template," the system fills the library interface 144 (FIG. 1A) with drill data. The system also populates the schedule bubbles (e.g., schedule bubbles 116a-116h) with category data related to the pre-made practice template. The library interface 144 may be connected to a backend storage component that stores some of the drill data from the library. For each schedule bubble that the user selects, the library interface 144 is automatically filled (e.g., at the backend storage) with corresponding drills. An example process is described in detail below.

First, the user goes through each schedule bubble that has been filled and selects it. When the user selects "Warm Up" in the first bubble 116a, the library interface 144 fills with all the warm up drills that are part of that template package. Then, the user can drag any desired drills into the "Warm Up" schedule bubble 116a from the library interface 144. Next, the user selects "Shooting" in a second bubble 116b. The library interface 144 fills with all the shooting drills that are part of that template package. The user then drags any desired shooting drills into the "Shooting" schedule bubble 116b. Next, the user presses on a "Passing" schedule bubble 116c and the library interface 144 fills with all the passing drills in the template package. The user then drags any desired shooting drills into the "Passing" schedule bubble 116c. This process continues until the user has filled all the schedule bubbles 116a-116h with drill content from the library for the Indiana Practice Template Package.

Presenting an Activity Plan to a User

Figure 15:
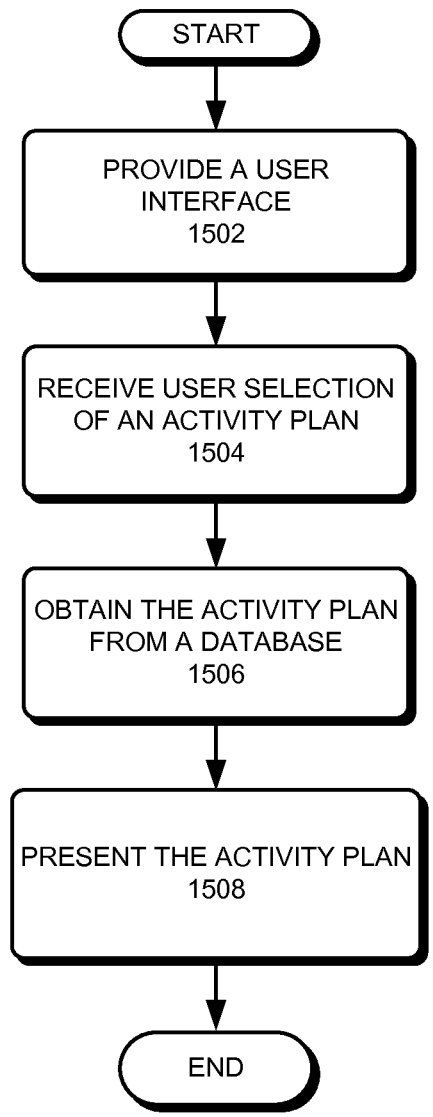
FIG. 15 presents a flow chart illustrating a process for presenting an activity plan to a user.

FIG. 15 presents a flow chart illustrating a process for presenting an activity plan to a user. During operation, the activity plan management system provides a user interface that allows a user to access previously authored activity plans on a mobile device (operation 1502). The plans may be stored in a database. The system receives a user selection of an activity plan (operation 1504). The user selection may be received through user interaction with a touchscreen presenting available activity plans. The system obtains activity plans from a database (operation 1506). This database can be stored locally on the mobile device. This database can also include the library with activity plans and activity items. The system presents the selected activity plan to the user on the mobile device (operation 1508).

Exemplary Computer System Implementing Activity Management Application

Figure 16:
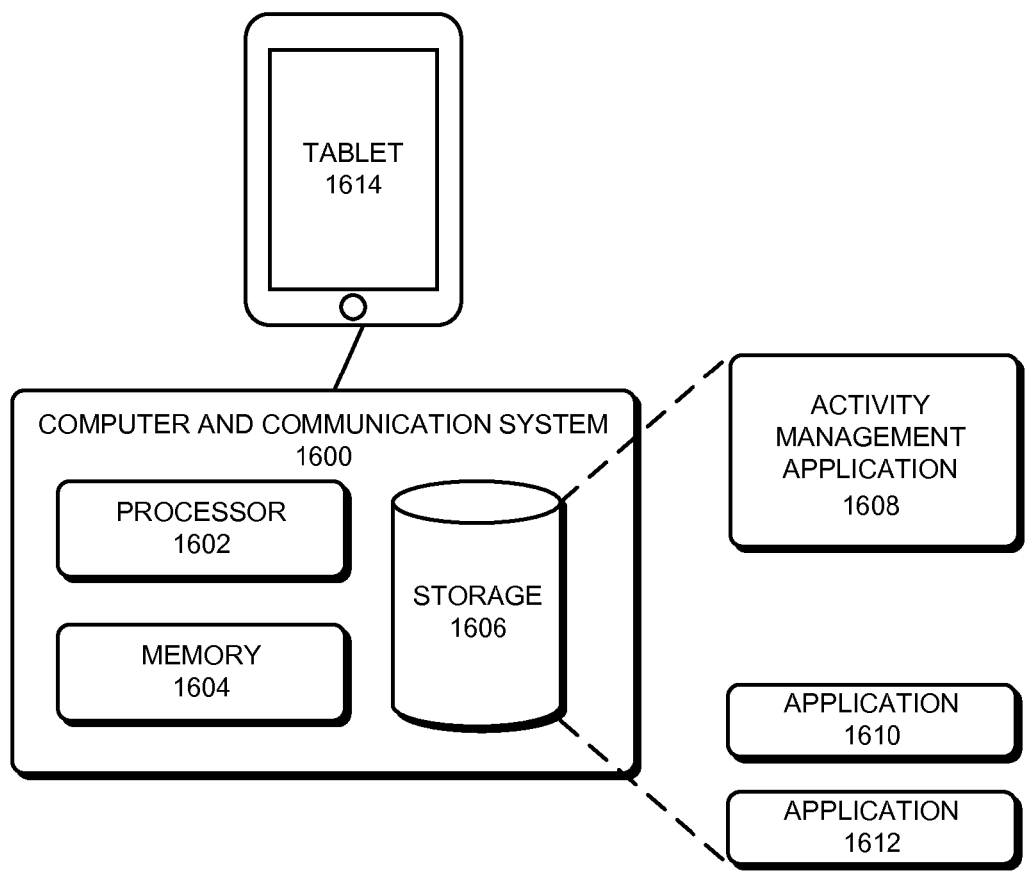
FIG. 16 presents a diagram illustrating an exemplary computer system for implementing the activity management application, in accordance with one embodiment of the present invention.

FIG. 16 presents a diagram illustrating an exemplary computer system for implementing the activity management application, in accordance with one embodiment of the present invention. In one embodiment, a computer and communication system 1600 includes a processor 1602, a memory 1604, and a storage device 1606. Storage device 1606 stores an activity management application 1608, as well as other applications, such as applications 1610 and 1612. During operation, the activity management application 1608 is loaded from storage device 1606 into memory 1604 and then executed by processor 1602. While executing the program, processor 1602 performs the aforementioned functions. Computer and communication system 1600 is part of a portable computing device, such as a tablet 1614 (e.g., iPAD®).

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method performed by a mobile device, comprising:
   providing a user interface that allows a user to access previously authored activity plans on a mobile device, wherein an activity plan includes a plurality of activity items, wherein each activity item is associated with a category;
   receiving user input to select a schedule bubble that displays a particular category;
   displaying a plurality of activity items that belong to the particular category of the selected schedule bubble;
   receiving user input to drag to the selected schedule bubble at least one activity item belonging to the particular category, thereby assigning the at least one activity item belonging to the particular category associated with the selected schedule bubble to the selected schedule bubble;
   displaying the new activity plan as a sequence of schedule bubbles, wherein each schedule bubble represents a block of time, and wherein each schedule bubble is associated with one or more activity items;
   receiving user input to select a particular activity item associated with a particular schedule bubble;
   displaying a new window with at least one of: a video clip, a link to a video clip, a picture, a link to a picture, a diagram, a link to a diagram, an activity item usage count, and an activity item most recent usage date, associated with the particular schedule bubble;
   storing, in a database, data that represents the new activity plan with the assignment of the at least one activity item to the selected schedule bubble;
   receiving a user selection of the new activity plan;
   obtaining the new activity plan from the database, wherein the database stores previously authored activity plans; and
   presenting the new activity plan to the user on the mobile device.

2. The method of claim 1, wherein each activity item includes at least one of an equipment listing, an associated video, and a category;
   wherein each activity item is assigned to at least one category; and wherein
   the method further comprises:
   receiving user input to specify at least the title, the associated video, and the category for a new activity item; and
   storing the new activity item with the title, the associated video, and the category in the database on the mobile device.

3. The method of claim 1, further comprising:
   displaying, on a portion of a screen of the mobile device, a library interface, wherein the library interface displays at least one activity item;
   displaying, on a separate portion of the screen of the mobile device, a plurality of schedule bubbles, wherein each schedule bubble represents a block of time;
   receiving user input to associate an activity item from the library interface with at least one of the plurality of schedule bubbles; and
   storing, in the database on the mobile device, a practice plan that includes the association of the activity item with the at least one of the plurality of schedule bubbles.

4. The method of claim 1, further comprising:
   receiving user input specifying a time duration for each schedule bubble of the new activity plan and a total practice time for the new activity plan, wherein each schedule bubble represents a block of time;
   receiving at least one user input to assign an activity item to a schedule bubble of the new activity plan; and
   adding the activity item to the new activity plan in the database on the mobile device.

5. The method of claim 1, further comprising:
   receiving user input to select an activity item from the new activity plan, wherein the activity item is associated with one or more video clips; and
   playing a video clip from the one or more video clips on the mobile device.

6. The method of claim 1, wherein the new activity plan is a practice plan for a sport, further comprising:
   displaying a print preview screen with a schedule of times associated with each activity item, wherein each activity item is a practice drill activity item, and
   wherein one or more of the activity items include equipment data for executing the practice drill;
   receiving user input to select a particular activity item; and
   displaying a diagram of a court associated with the selected particular activity item.

7. The method of claim 1, further comprising:
   receiving user input to select an activity plan template from a plurality of templates, wherein the activity plan template specifies a specific category for each schedule bubble of a new activity plan; and
   displaying one or more schedule bubbles, wherein each schedule bubble represents a block of time and each schedule bubble is displayed with an associated category in accordance with the activity plan template.

8. A computing system for managing activity plans, the system comprising:
   one or more processors,
   a computer-readable medium coupled to the one or more processors having instructions stored thereon that, when executed by the one or more processors, cause the one or more processors to perform a method comprising:
   providing a user interface that allows a user to access previously authored activity plans on a mobile device, wherein an activity plan includes a plurality of activity items, wherein each activity item is associated with a category;

receiving user input to select a schedule bubble that displays a particular category;

displaying a plurality of activity items that belong to the particular category of the selected schedule bubble;

receiving user input to drag to the selected schedule bubble at least one activity item belonging to the particular category, thereby assigning the at least one activity item belonging to the particular category associated with the selected schedule bubble to the selected schedule bubble;

displaying the new activity plan as a sequence of schedule bubbles, wherein each schedule bubble represents a block of time, and wherein each schedule bubble is associated with one or more activity items;

receiving user input to select a particular activity item associated with a particular schedule bubble;

displaying a new window with at least one of: a video clip, a link to a video clip, a picture, a link to a picture, a diagram, a link to a diagram, an activity item usage count, and an activity item most recent usage date, associated with the particular schedule bubble;

storing, in a database, data that represents the new activity plan with the assignment of the at least one activity item to the selected schedule bubble;

receiving a user selection of the new activity plan;

obtaining the new activity plan from the database, wherein the database stores previously authored activity plans; and presenting the new activity plan to the user on the mobile device.

9. The computing system of claim 8, wherein each activity item includes at least one of an equipment listing, an associated video, and a category;

wherein each activity item is assigned to at least one category; and wherein the method further comprises:

receiving user input to specify at least the title, the associated video, and the category for a new activity item; and storing the new activity item with the title, the associated video, and the category in the database on the mobile device.

10. The computing system of claim 8, wherein the computer-readable storage medium stores additional instructions that, when executed, cause the one or more processors to perform additional steps comprising:

displaying, on a portion of a screen of the mobile device, a library interface, wherein the library interface displays at least one activity item;

displaying, on a separate portion of the screen of the mobile device, a plurality of schedule bubbles, wherein each schedule bubble represents a block of time;

receiving user input to associate an activity item from the library interface with at least one of the plurality of schedule bubbles; and storing, in the database on the mobile device, a practice plan that includes the association of the activity item with the at least one of the plurality of schedule bubbles.

11. The computing system of claim 8, wherein the computer-readable storage medium stores additional instructions that, when executed, cause the one or more processors to perform additional steps comprising:

receiving user input specifying a time duration for each schedule bubble of the new activity plan and a total practice time for the new activity plan, wherein each schedule bubble represents a block of time;

receiving at least one user input to assign an activity item to a schedule bubble of the new activity plan; and adding the activity item to the new activity plan in the database on the mobile device.

12. The computing system of claim 8, wherein the computer-readable storage medium stores additional instructions that, when executed, cause the one or more processors to perform additional steps comprising:

receiving user input to select an activity item from the new activity plan, wherein the activity item is associated with one or more video clips; and playing a video clip from the one or more video clips on the mobile device.

13. The computing system of claim 8, wherein the new activity plan is a practice plan for a sport, and wherein the computer-readable storage medium stores additional instructions that, when executed, cause the one or more processors to perform additional steps comprising:

displaying a print preview screen with a schedule of times associated with each activity item, wherein each activity item is a practice drill activity item, and wherein one or more of the activity items include equipment data for executing the practice drill;

receiving user input to select a particular activity item; and displaying a diagram of a court associated with the selected particular activity item.

14. A non-transitory computer-readable storage medium storing instructions that when executed by a computer cause the computer to perform a method for managing activity plans, the method comprising:

providing a user interface that allows a user to access previously authored activity plans on a mobile device, wherein an activity plan includes a plurality of activity items, wherein each activity item is associated with a category;

receiving user input to select a schedule bubble that displays a particular category;

displaying a plurality of activity items that belong to the particular category of the selected schedule bubble;

receiving user input to drag to the selected schedule bubble at least one activity item belonging to the particular category, thereby assigning the at least one activity item belonging to the particular category associated with the selected schedule bubble to the selected schedule bubble;

displaying the new activity plan as a sequence of schedule bubbles, wherein each schedule bubble represents a block of time, and wherein each schedule bubble is associated with one or more activity items;

receiving user input to select a particular activity item associated with a particular schedule bubble;

displaying a new window with at least one of: a video clip, a link to a video clip, a picture, a link to a picture, a diagram, a link to a diagram, an activity item usage count, and an activity item most recent usage date, associated with the particular schedule bubble;

storing, in a database, data that represents the new activity plan with the assignment of the at least one activity item to the selected schedule bubble;

receiving a user selection of the new activity plan;

obtaining the new activity plan from the database, wherein the database stores previously authored activity plans; and presenting the new activity plan to the user on the mobile device.

15. The non-transitory computer-readable storage medium of claim 14, wherein the computer-readable storage medium stores additional instructions that, when executed, cause the one or more processors to perform additional steps comprising:

displaying, on a portion of a screen of the mobile device, a library interface, wherein the library interface displays at least one activity item;

displaying, on a separate portion of the screen of the mobile device, a plurality of schedule bubbles, wherein each schedule bubble represents a block of time;

receiving user input to associate an activity item from the library interface with at least one of the plurality of schedule bubbles; and storing, in the database on the mobile device, a practice plan that includes the association of the activity item with the at least one of the plurality of schedule bubbles.

16. The non-transitory computer-readable storage medium of claim 14, wherein the computer-readable storage medium stores additional instructions that, when executed, cause the one or more processors to perform additional steps comprising:

receiving user input specifying a time duration for each schedule bubble of the new activity plan and a total practice time for the new activity plan, wherein each schedule bubble represents a block of time;

receiving at least one user input to assign an activity item to a schedule bubble of the new activity plan; and adding the activity item to the new activity plan in the database on the mobile device.

17. The non-transitory computer-readable storage medium of claim 14, wherein the computer-readable storage medium stores additional instructions that, when executed, cause the one or more processors to perform additional steps comprising:

receiving user input to select an activity item from the new activity plan, wherein the activity item is associated with one or more video clips; and playing a video clip from the one or more video clips on the mobile device.

18. The non-transitory computer-readable storage medium of claim 14, wherein the new activity plan is a practice plan for a sport, and wherein the computer-readable storage medium stores additional instructions that, when executed, cause the one or more processors to perform additional steps comprising:

displaying a print preview screen with a schedule of times associated with each activity item, wherein each activity item is a practice drill activity item, and wherein one or more of the activity items include equipment data for executing the practice drill;

receiving user input to select a particular activity item; and displaying a diagram of a court associated with the selected particular activity item.

* * * * *